Nov. 5, 1963  G. O. HAYWARD  3,109,419
HARPOON GUNS
Filed July 14, 1961  4 Sheets-Sheet 1
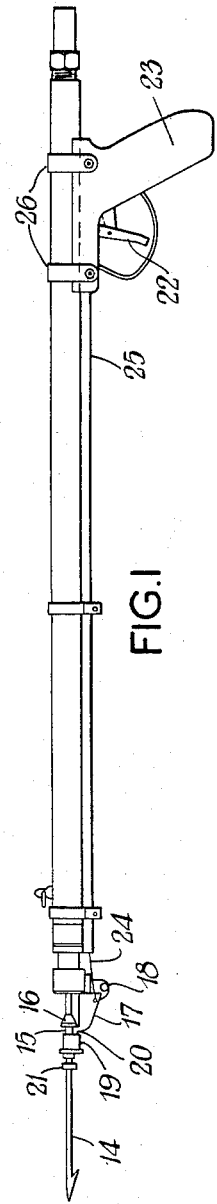
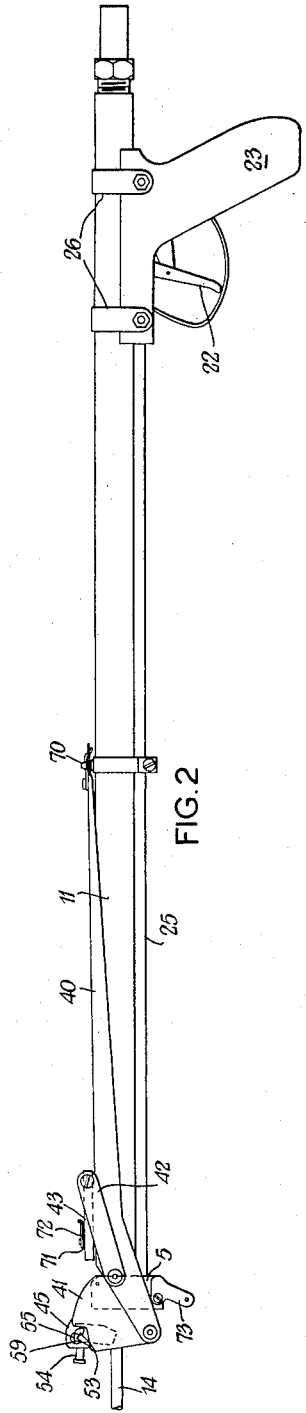

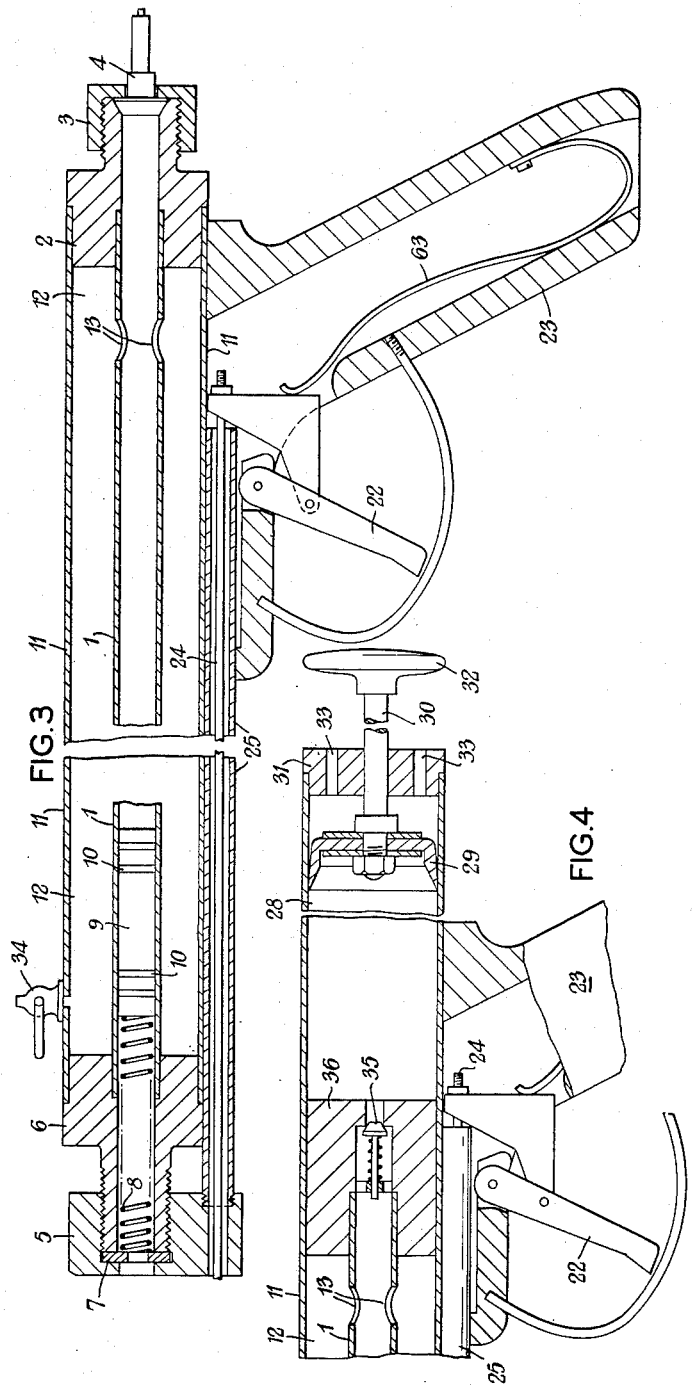

Nov. 5, 1963  G. O. HAYWARD  3,109,419
HARPOON GUNS

Filed July 14, 1961  4 Sheets-Sheet 4

United States Patent Office 3,109,419
Patented Nov. 5, 1963

1

3,109,419
HARPOON GUNS
Gilbert Osborne Hayward, W.A.C.R.I. P.O. Box 8,
Tafo, Ghana, West Africa
Filed July 14, 1961, Ser. No. 124,177
6 Claims. (Cl. 124—13)

The present invention relates to harpoon guns for use in under water fishing and for like purposes of the kind in which a harpoon is ejected from a tube or barrel by compressed air.

An object of the present invention is to provide a harpoon gun for under water fishing and the like which is inexpensive to manufacture and is yet sufficiently strong to withstand rough usage without danger of injury to the barrel.

Another object is to provide an improved air reservoir and to facilitate the charging of the reservoir with compressed air.

According to the present invention a harpoon gun for underwater fishing and like purposes in which the harpoon is ejected from the barrel by compressed air, comprises a gun barrel mounted within an outer casing, the annular chamber between the outer casing and the gun barrel forming a compressed air reservoir, a piston situated in the barrel and capable of being thrust rearwardly by the insertion of a harpoon into the barrel and a sear member adapted to hold the harpoon in the loaded position, the sear having connection means with the trigger whereby on the pulling of the trigger the sear will be rocked to allow of the release of the harpoon.

The harpoon gun is preferably provided with loading means whereby another or the same harpoon may be reloaded into the gun after a firing operation.

In the accompanying drawings which show examples of harpoon guns according to the present invention;

FIGURE 1 is a side elevation of one example of harpoon gun;

FIGURE 2 is a side elevation of another example of harpoon gun, the loading lever mechanism being folded up;

FIGURE 3 is a side sectional elevational of the gun shown in FIGURE 2, the harpoon holding portion of the gun having been removed;

FIGURE 4 is a side sectional elevation of the rear end of a gun incorporating a pump within the outer casing;

Figures 5, 8:
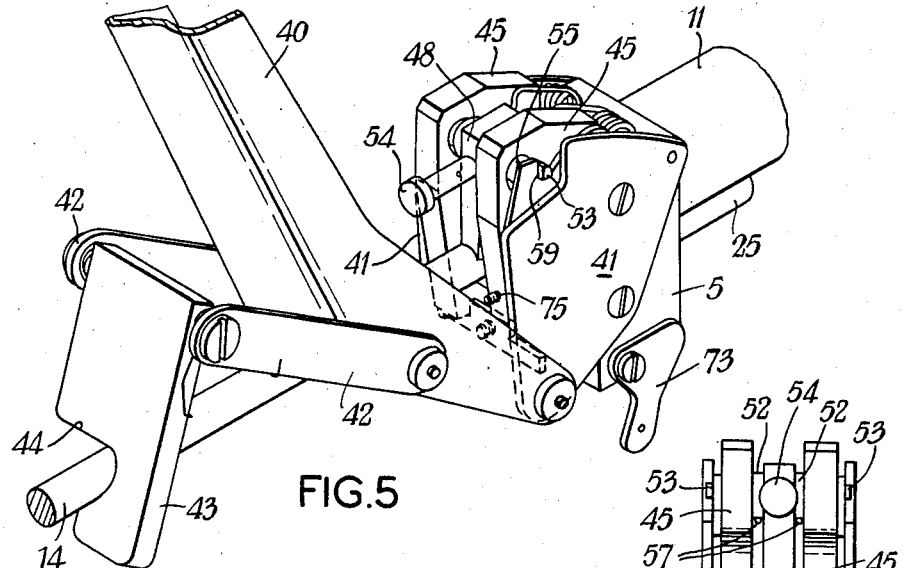
FIGURE 5 is a perspective view of the front end of the gun, on a larger scale, shown in FIGURE 2.
FIGURE 8 is a front elevation of the front end of the gun shown in FIGURE 5, the loading lever being removed for clarity.

A length of half inch tubing 1 constitutes the barrel proper, being mounted at each end in a bored plug or gland having a screw threaded portion for a nut. The nut 3 on the rear plug 2 secures a standard type non-return pneumatic valve 4 similar to a pneumatic tyre valve.

The nut 5 on the plug 6 at the front end secures a washer 7 acting as an abutment for a coiled spring 8 acting on a piston 9.

The piston 9 is cylindrical and has grooves for packing rings 10.

A tube 11 conveniently of 1″ diameter surrounds the barrel 1 and is brazed to the end plugs 2 and 6 so as to form an outer protecting casing leaving an annular air space 12 between it and the barrel which forms a reservoir for compressed air pumped in through the non-return valve 4 and passing into the reservoir through holes 13 in the barrel 1 near the rear end.

When the gun is charged with compressed air, the piston 9 is forced towards the front end compressing the coiled spring 8.

When the gun is loaded, the harpoon 14 is thrust down the barrel forcing back the piston 9 against the air pressure. In the example shown in FIGURE 1 the harpoon is forced down the barrel, an operation requiring considerable manual strength, but in the example shown in the other drawings a lever system of loading is employed as hereinafter described.

In FIGURE 1 the harpoon 14 is fitted with a ferrule 15 having a conical collar 16 so that when it is fully thrust into the loaded position, the collar 16 snaps behind a spring controlled catch or sear 17 mounted on nut 5 at the front end of the barrel. The sear 17 is pivotally mounted and is provided with a spiral spring 18 tending to hold it in engagement.

A safety lock is preferably provided consisting for example of a sleeve 19, adapted to be slid over a tongue 20 on the catch or sear 17.

The sleeve 19 when in the unlocking position is thrust into a stop 21.

When unlocked the catch or sear 17 is released when required by a trigger 22 which is mounted on a stock 23 near the rear end of the barrel, the trigger 22 being connected to the sear 17 by a rod 24 sliding in a tube 25 on the outside of the casing 11.

As the inner and outer tubes, that is the barrel and the casing, can be made of stock material, the gun can be made very economically.

The stock 23 can be clamped by sheet metal clamps 26 screwed or otherwise to the outer tube or casing 11.

The annular space 12 between the casing 11 and the barrel 1 provides ample space for storage of compressed air, avoiding the use of a bulky container liable to interfere with the sighting of the gun. The casing also adequately protects the barrel should the gun be inadvertently brought into contact with a rock or other obstruction.

Although an ordinary pump may be used to charge the reservoir, a pump may be incorporated in the gun and be suitably connected with a check valve so that the user can readily operate it.

For example, as indicated in FIGURE 4, the casing 11 is extended beyond a plug 36 which supports the rear end of the barrel 1 and is fitted with a check valve 35. The extended portion 28 of the casing 11 acts as a pump barrel being fitted with an air pump piston 29 and the rod 30 of which passes through a gland 31 and may be fitted with a grip 32. Air inlet holes 33 are provided in the gland 31.

In order to render it easier to load the gun with the harpoon, the reservoir may be provided with a relief valve, as indicated at 34, so that by lowering the air pressure, less effort is required to thrust back the piston when inserting the harpoon in the barrel.

To assist in the loading of a harpoon the device shown in FIGURES 2 and 5 to 11 are preferably provided.

The device consists of a lever arm 40 pivotally mounted on cheekplates 41 screwed to the nut 5. Pivotally mounted on each side of the lever 40 are links 42 which carry at their outer ends a plate 43 having a slot 44 in one side. The diameter of the slot is slightly greater than that of the harpoon 14 which passes through the slot. There is sufficient "play" in the mounting of the links 42 on the lever 40 to allow of the plate 43 to be moved so that the harpoon can be disengaged from the slot 43.

The sides of the slot are straight, that is, not bevelled, so that as the lever is oscillated to and fro the plate will slide along the harpoon shaft as the lever moves to the left and then as the lever is moved to the right, FIGURE 5, the plate will rock about the harpoon shaft and the sides of the slot will abut against the shaft so that continued movement of the lever will force the harpoon down the barrel for the length of stroke of the lever.

As the lever stroke is short a number of lever oscillations will be required and to prevent the harpoon being ejected during the idle stroke of the lever and plate a sear mechanism 47 acting as a one way lock and release mechanism is pivotally mounted in uprights 45 secured to a back plate 46 itself secured to the nut 5.

Figure 11:
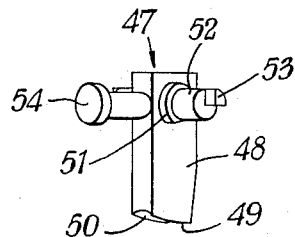

As shown in FIGURE 11 the sears 47 comprises a body 48 with an arcuate base 49 provided with an arcuate cross sectional channel 50.

The body 48 has laterally extending arms comprising collars 51, cylindrical portions 52 and wedge shaped members 53.

A control knob 54 is screwed into the body 48.

Each of the cylindrical portions 52 of the sear 47 passes through holes 55 in the uprights 45.

Each of the holes 55 is substantially kidney shaped in side elevation, the face 55' being at an angle of about $\tan^{-1}\mu + 3°$ to the axis of the harpoon. $\mu$ being the coefficient of friction between the two surfaces 55' and 53. In the example of these parts being made of stainless steel the angle of the face 55' to the axis of the harpoon will be approximately 7°.

Figure 10:
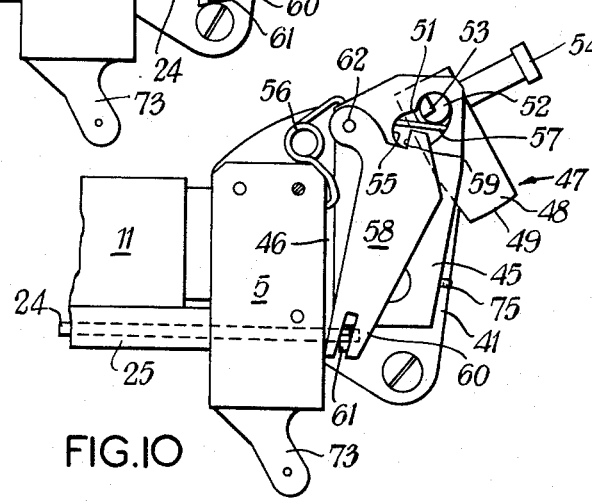
Figure 6:
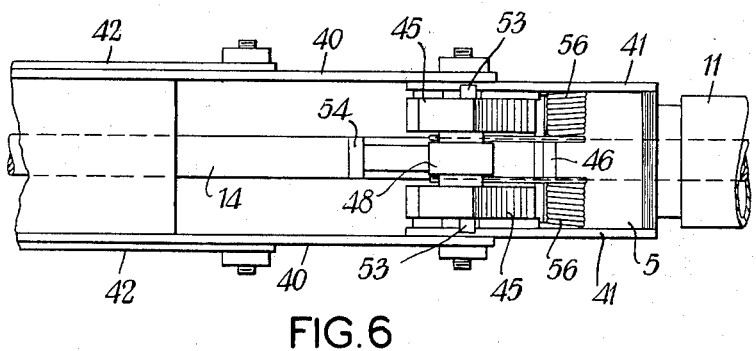
FIGURES 6 and 7 are respectively a top and bottom plan of the fore end of the gun shown in FIGURE 5 to a smaller scale.
Figure 7:
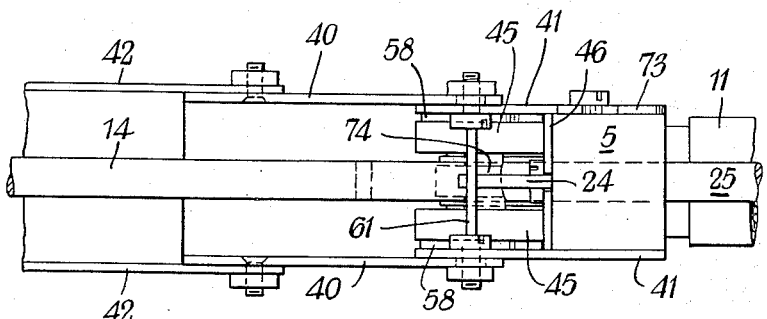

Coiled springs 56 resiliently urge the sear 47 into the position shown in FIGURE 10. The straight end portions 57 of the springs 56 bear against the collars 51.

In the position of the sear shown in FIGURE 10 the whole body 48 is clear of the shaft of the harpoon.

Pivotally mounted on each of the uprights 45 is a sear plate 58 having an abutment 59 at the top and a bifurcated end 60, the legs of which straddle a cross member 61 to which the trigger rod 24 is secured. Pulling the trigger will thus rock the sear plates about their pivot points 62.

Figure 9:
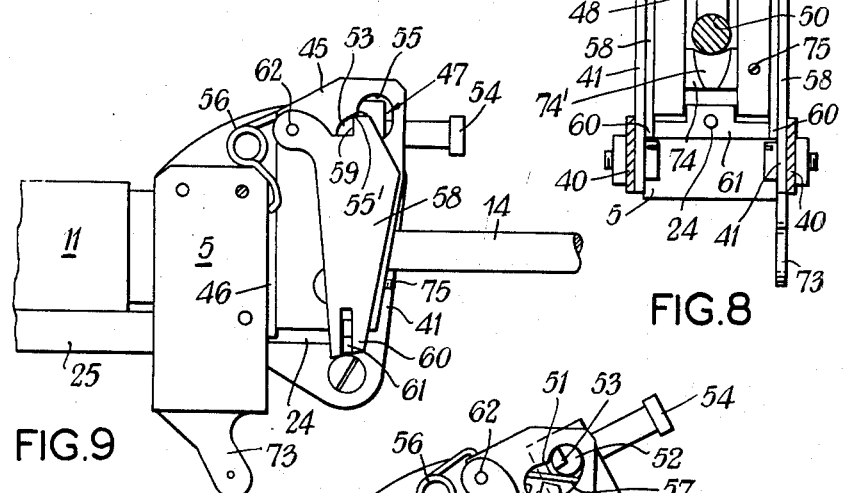
FIGURES 9 and 10 are side elevations of the front end of the gun shown in FIGURE 5 showing respectively the gun in the loaded and fired positions, one of the cheekplates being removed to show certain parts, and, FIGURE 11 is a perspective view of a sear.

To load the harpoon into the barrel, the end of the harpoon shaft is pushed as far as it will go into the barrel and the sear 47 is then swung from the position shown in FIGURE 10 to the position shown in FIGURE 9 by the knob 54. A spring 63 in the stock 23 urges the trigger forwardly, and with it the trigger rod 24, so that as the sear 47 is pushed rearwardly and downwardly, against the action of the springs 56, in the holes 55, so that sear plates will partly rotate to bring the abutments 59 across the holes 55, locking the sear 47 in position. The wedge members 53 bear against the abutments 59. The contact between the wedge members and abutments is such that the sear 47 can rock about the apices of the wedges.

As the lever 40 is oscillated to push the shaft of the harpoon into the barrel, as already described, so the sear member will be pushed rearwardly as the harpoon is pushed inwardly; the relationship between the position of the arcuate bottom of the sear and the harpoon shaft is such that when rocked rearwardly the shaft will pass freely into the barrel, but movement of the shaft in the outward direction, when the sear is in the position shown in FIGURE 9, the sear channel will jam against the harpoon shaft, which will be gripped between the channel 50 and an anvil 74 on the uprights 45, FIGURE 8, to prevent movement. Thus the oscillations of the lever will feed the shaft into the barrel.

The anvil 74 is provided with a groove 74' of arcuate cross section and tapering in width for locating the harpoon in the barrel. The anvil which is rotatable on the uprights 45 is locked by a set screw 75 when the groove 74' is suitably positioned.

When the trigger is pulled the sear plates will rock about their pivots and allow the sear to move forwardly and upwardly as shown in FIGURE 10, allowing the harpoon to be released from the gun.

As shown in FIGURE 2 the lever 40 may be folded against the barrel 11 when the gun is not in use or when the gun is loaded ready to be fired.

The lever 40 is held in place by a stud 70 which passes through a hole in the lever 40. A spring arm, not shown, is displaced by the passage of the stud through the hole in the lever and locks the lever in the folded position.

To prevent the plate 43 swinging, the lever 40 is provided with a pillar 71 having a spring arm 72 pivotally mounted thereon. The pillar passes through the slot 44 and the arm 72 is turned to lock the plate against movement.

A plate 73 is bolted to the nut 5 for attachment of one end of a line, the other end of the line being secured to the harpoon.

It will be appreciated that when the lever loading system is utilised it is not necessary for the harpoon to have the ferrule 15.

I claim:

1. A harpoon gun for underwater fishing and like purposes comprising:
   (a) a gun barrel,
   (b) an outer casing within which the gun barrel is mounted,
   (c) an annular space between the outer casing and the gun barrel forming a compressed air reservoir,
   (d) a piston situated in the barrel and adapted to be thrust forwardly from a rearwards position by compressed air in the annular space to thereby eject a harpoon from the barrel and adapted to be thrust rearwardly from a forward position by insertion of a harpoon into the barrel,
   (e) lever loading means whereby the harpoon can be thrust into the barrel,
   (f) the lever loading means including a lever and a one-way drive attachment whereby on oscillation of the lever the harpoon will be thrust rearwardly only,
   (g) sear means co-operating with the lever loading means to hold the harpoon against forward movement during an idle, inoperative stroke of the lever and to hold the harpoon in a loaded position; and
   (h) a gun trigger connected to the sear means whereby on pulling the trigger the sear means are actuated to allow release of the harpoon.

2. A harpoon gun as set forth in claim 1, wherein the sear means is adapted to hold the harpoon by frictional engagement of a sear with the shaft of the harpoon.

3. A harpoon gun as set forth in claim 2, wherein the sear has an arcuate portion to engage a complementarily shaped portion of the harpoon shaft.

4. A harpoon gun as set forth in claim 2, wherein the sear means comprise a sear rockable about pivots to allow movement of the harpoon in a rearwards direction only, sear plates which restrain the sear from movement other than rocking about the pivots, and release means whereby on pulling the trigger the sear plates move to release the sear which can then move within limits to allow ejection of the harpoon from the barrel.

5. A harpoon gun as set forth in claim 2, wherein the lever loading means is located at the forward end of the gun.

6. A harpoon gun as set forth in claim 5, wherein the sear means is situated externally and at the front end of the barrel and is controlled by a rod extending to and operated by a trigger situated near a gun stock.

References Cited in the file of this patent

UNITED STATES PATENTS

| | | |
|---|---|---|
| 1,986,166 | Schneider | Jan. 1, 1935 |
| 2,542,777 | Loew | Feb. 20, 1951 |
| 2,718,253 | Zinke | Sept. 20, 1955 |
| 2,736,308 | Ferrando et al. | Feb. 28, 1956 |
| 2,900,972 | Marsh et al. | Aug. 25, 1959 |
| 2,923,285 | Salles | Feb. 2, 1960 |
| 2,923,286 | Draganti | Feb. 2, 1960 |